United States Patent
Cui et al.

(10) Patent No.: US 11,632,819 B2
(45) Date of Patent: Apr. 18, 2023

(54) TCI CHANGE ENHANCEMENT

(71) Applicant: Apple Inc., Cupertino, CA (US)

(72) Inventors: Jie Cui, San Jose, CA (US); Dawei Zhang, Saratoga, CA (US); Hong He, San Jose, CA (US); Manasa Raghavan, Sunnyvale, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/303,280

(22) Filed: May 26, 2021

(65) Prior Publication Data
US 2021/0378042 A1 Dec. 2, 2021

Related U.S. Application Data

(60) Provisional application No. 63/031,244, filed on May 28, 2020.

(51) Int. Cl.
*H04W 76/20* (2018.01)

(52) U.S. Cl.
CPC .................... *H04W 76/20* (2018.02)

(58) Field of Classification Search
CPC ..... H04W 76/20; H04W 84/12; H04W 72/04; H04W 24/02; H04L 5/0023; H04L 5/0053
See application file for complete search history.

(56) References Cited

U.S. PATENT DOCUMENTS

2019/0215701 A1* 7/2019 Honglei ............... H04W 16/28
2020/0015200 A1* 1/2020 Vilaipornsawai ..... H04L 1/1819

FOREIGN PATENT DOCUMENTS

WO 2019/049096 3/2019

OTHER PUBLICATIONS

Huawei et al., "Email discussion summary for [94e Bis][101] NR_NewRAT_RRM_Core", 3GPP RAN WG4, R4-2005382, May 4, 2020, 65 sheets.

* cited by examiner

*Primary Examiner* — Jamal Javaid
(74) *Attorney, Agent, or Firm* — Fay Kaplun & Marcin, LLP

(57) ABSTRACT

A user equipment (UE) is configured to change a transmission configuration indicator (TCI) state. The receives, from the base station, a network flag indicating a transmission configuration indicator (TCI) state change configuration for the network, determines a time span for continuing to use a current TCI state prior to switching to a new TCI state based on the network flag and switches to the new TCI state after the time span.

20 Claims, 5 Drawing Sheets

TCI CHANGE ENHANCEMENT

PRIORITY CLAIM/INCORPORATION BY REFERENCE

This application claims priority to U.S. Provisional Application Ser. No. 63/031,244 filed on May 28, 2020 and entitled "TCI Change Enhancement," the entirety of which is incorporated by reference herein.

BACKGROUND INFORMATION

A transmission configuration indicator (TCI) state contains parameters for configuring a quasi co-location (QCL) relationship between one or more downlink (DL) reference signals (DLRS) and corresponding antenna ports. A TCI state change may be implemented by a network and indicated to a user equipment (UE) in the network. The UE is expected to complete the switch from the former TCI state to the new TCI state within a specified delay time.

SUMMARY

Some exemplary embodiments are related to a processor of a user equipment (UE) communicating with a base station of a network and configured to perform operations. The operations include receiving, from the base station, a network flag indicating a transmission configuration indicator (TCI) state change configuration for the network, determining a time span for continuing to use a current TCI state prior to switching to a new TCI state based on the network flag and switching to the new TCI state after the time span.

Other exemplary embodiments are related to a user equipment (UE) having a transceiver configured to communicate with a base station of a network and a processor communicatively coupled to the transceiver and configured to perform operations. The operations include receiving, from the base station, a network flag indicating a transmission configuration indicator (TCI) state change configuration for the network, determining a time span for continuing to use a current TCI state prior to switching to a new TCI state based on the network flag and switching to the new TCI state after the time span.

Still further exemplary embodiments are related to a processor of a user equipment (UE) communicating with a base station of a network and configured to perform operations. The operations include receiving, from the base station, a TCI state change indicator in either one of a medium access control (MAC) control element (CE) or a radio resource control (RRC) activation command, using a current TCI state for a first span of time when the TCI state change indicator is MAC CE based and using a current TCI state for a second span of time different from the first span of time when the TCI state change indicator is RRC based.

DETAILED DESCRIPTION

Figure 1:
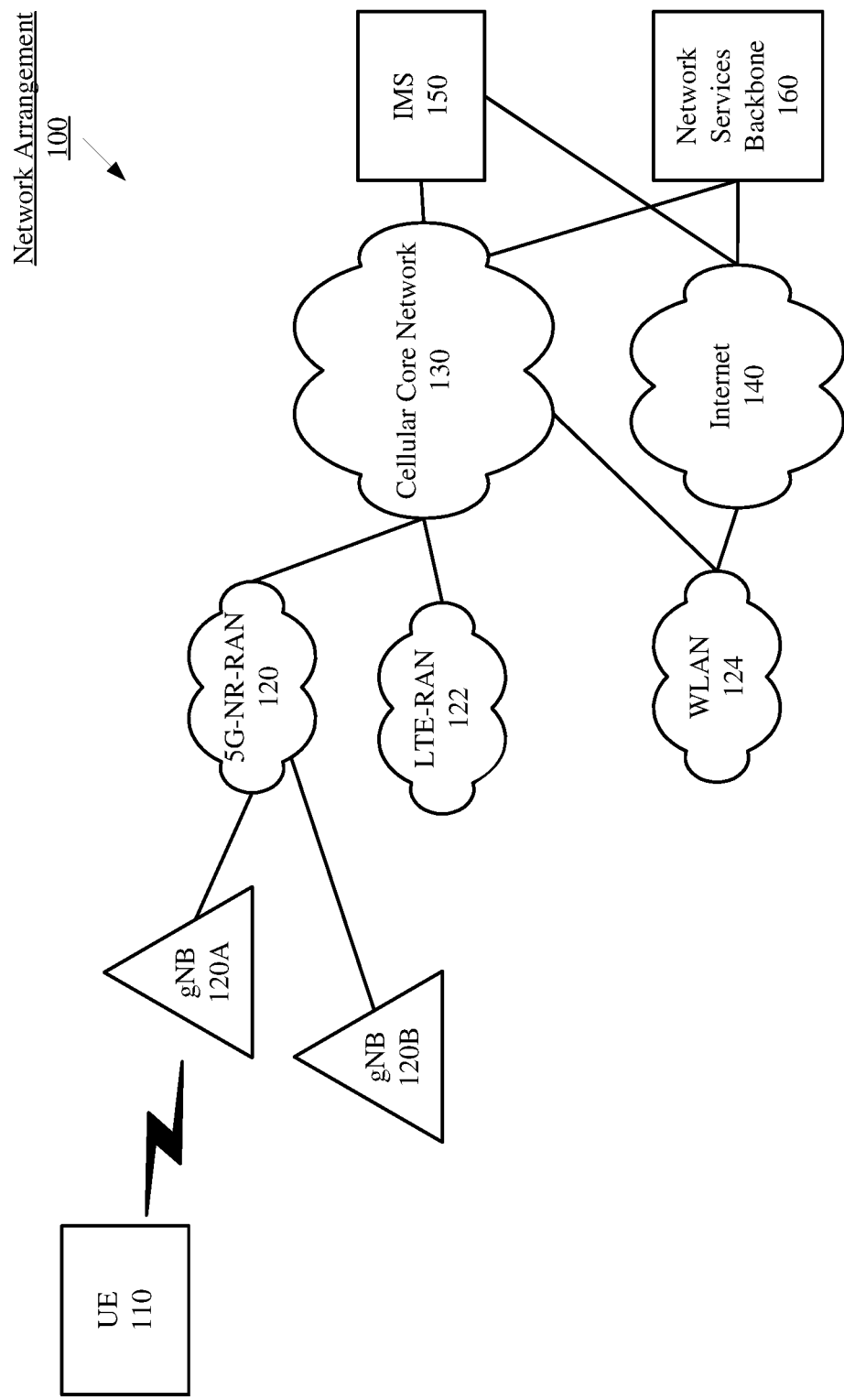
FIG. 1 shows a network arrangement according to various exemplary embodiments.

The exemplary embodiments may be further understood with reference to the following description and the related appended drawings, wherein like elements are provided with the same reference numerals. The exemplary embodiments describe configurations for a user equipment (UE) in a 5G New Radio (NR) network related to an allowable delay time for switching a TCI state. The delay time may be specified differently in various network releases, and a mismatch between releases may occur between, for example, a new release UE and a network using an older release. Network and UE resources may be wasted when such a mismatch occurs between the network expectation for the UE behavior and the actual UE behavior. According to some exemplary embodiments, a network flag is used to indicate to the UE the network release or the network TCI usage so that the UE behavior may align with the network expectation.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
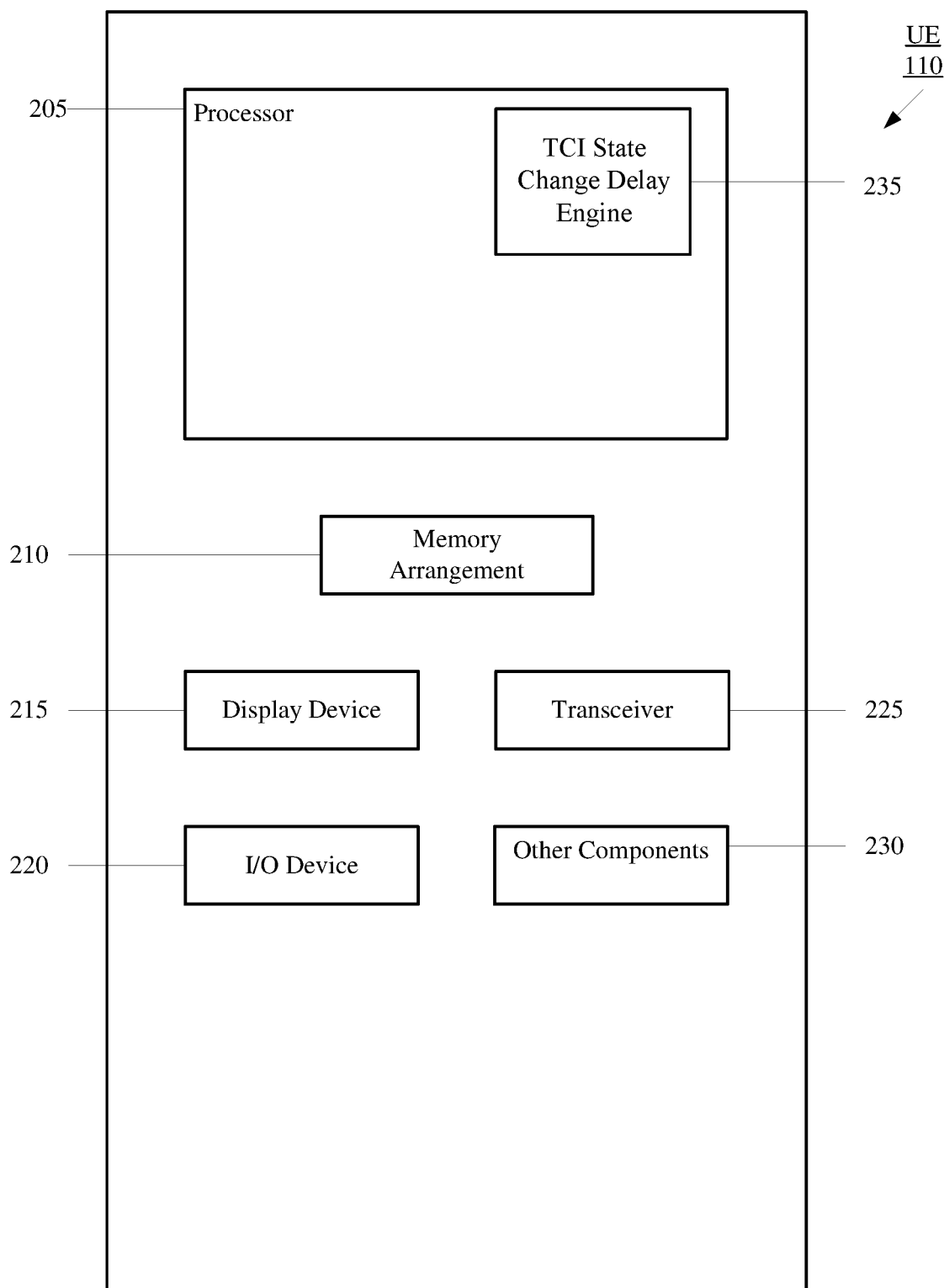
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a TCI state change delay engine 235. The TCI state change delay engine 235 may perform operations including determining a span of time for continuing to use an old TCI state after receiving a TCI state change indicator from the network. The UE 110 may make such a determination based on various parameters involved in the TCI state change, including, for example, whether the TCI state change was implemented via a Medium Access Control-Control Element (MAC-CE) or a Radio Resource Control (RRC) activation command. The specific implementations for various scenarios will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
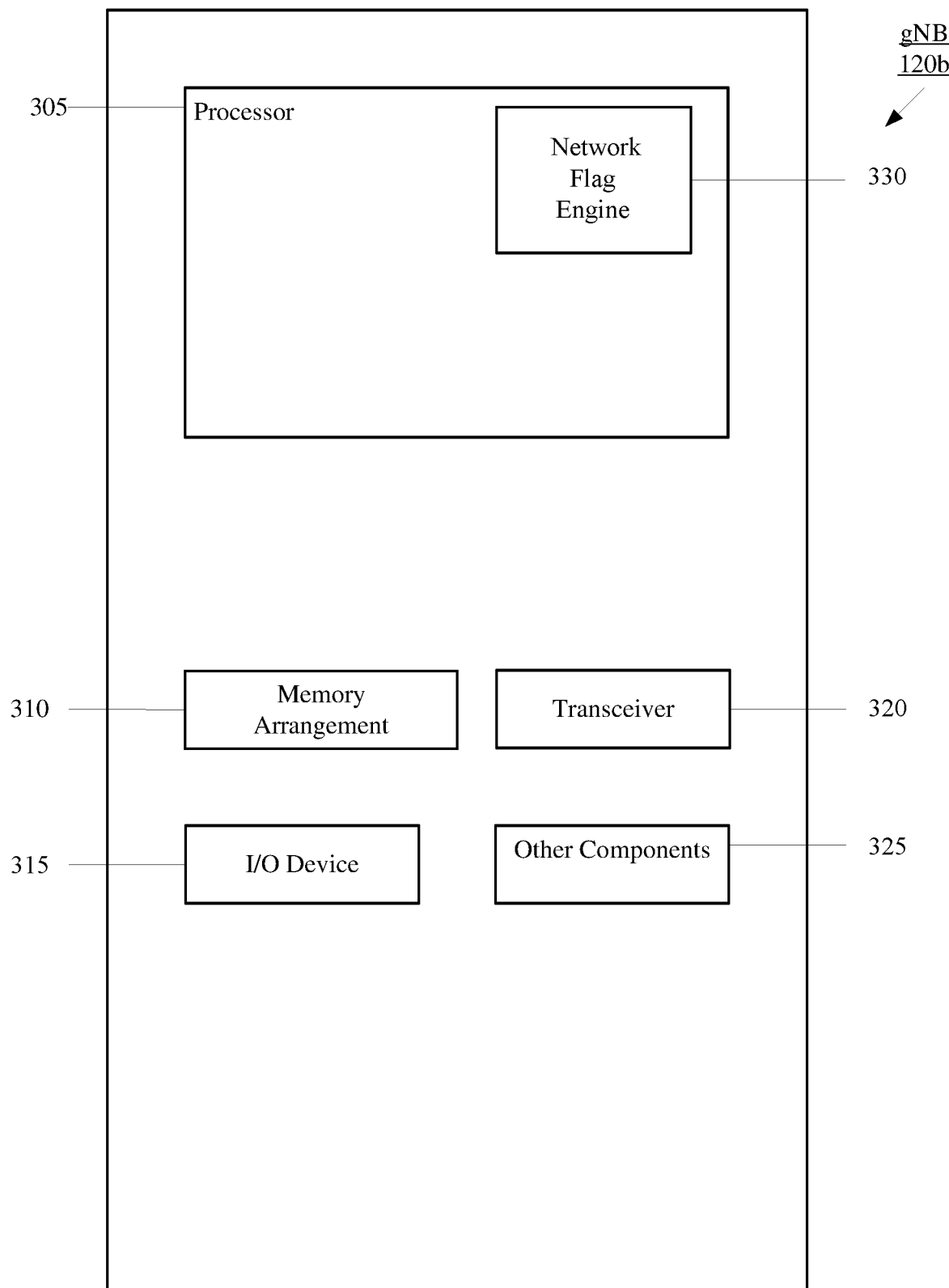
FIG. 3 shows an exemplary network base station according to various exemplary embodiments.

FIG. 3 shows an exemplary network base station, in this case gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a network flag engine 335. The network flag engine 335 may perform operations including generating and transmitting a network flag to the UE 110 indicating network TCI configuration parameters. The network flag may indicate a network release that the network is supporting, or may directly indicate a TCI usage. The specific implementations for various scenarios will be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

TCI State Change

A transmission configuration indicator (TCI) state contains parameters for configuring a quasi co-location (QCL)

relationship between one or more downlink (DL) reference signals (DLRS) and corresponding antenna ports, e.g., the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set. A user equipment (UE) may be configured with a list of up to M TCI state configurations within the higher layer parameters for decoding the PDSCH according to a detected PDCCH with downlink control information (DCI) for the UE and a given serving cell, where M depends on the capability of the UE. The TCI states may be transmitted to the UE from the network in a medium access layer (MAC) control element (CE), a DCI message, or a radio resource control (RRC) activation command.

A UE configured with one or more TCI state configurations on a serving cell shall complete the switch of the active TCI state within a delay defined in, for example, 3GPP TS38.133 section 8.10. The TCI state is considered "known" by the UE if a set of conditions are met within a period spanning from a last transmission of the RS resource used for the Layer 1 Received Signal Reference Power (L1-RSRP) measurement reporting for the target TCI state to the completion of the active TCI state switch. Otherwise, the TCI state may be considered "unknown."

For a MAC-CE based TCI state switch, the delay is defined in 3GPP TS38.133 section 8.10.3 in the following manner.

If the target TCI state is known, upon receiving the PDSCH carrying a MAC-CE activation command in slot n, the UE shall be able to receive the PDCCH with the target TCI state of the serving cell on which the TCI state switch occurs no later than in slot $n+T_{HARQ}+(3 \text{ ms}+TO_k*(T_{first-SSB}+T_{SSB-proc}))/\text{NR slot length}$ (Equation 1). The UE shall be able to receive the PDCCH with the old TCI state until slot $n+T_{HARQ}$ (3 ms+$TO_k*(T_{first-SSB})$)/NR slot length (Equation 2). $T_{HARQ}$ represents the timing between the DL data transmission and corresponding acknowledgement, as specified in 3GPP TS 38.213. $T_{first-SSB}$ represents the timing between the MAC CE command being decoded by the UE to the first SSB transmission after, where the SSB shall be the QCL-TypeA or QCL-TypeC for the target TCI state. $T_{SSB-proc}$=2 ms. $TO_k$=1 if the target TCI state is not in the active TCI state list for the PDSCH, and $TO_k$=0 if the target TCI state is in the active TCI state list for the PDSCH.

If the target TCI state is unknown, upon receiving the PDSCH carrying a MAC-CE activation command in slot n, the UE shall be able to receive the PDCCH with the target TCI state of the serving cell on which the TCI state switch occurs no later than in slot $n+T_{HARQ}+(3 \text{ ms}+T_{L1-RSRP} TO_{uk}*(T_{first-SSB} T_{SSB-proc}))/\text{NR slot length}$ (Equation 3). The UE shall be able to receive the PDCCH with the old TCI state until slot $n+T_{HARQ}+(3 \text{ ms}+T_{L1-RSRP}+TO_{uk}*(T_{first-SSB}))/\text{NR slot length}$ (Equation 4). $T_{L1-RSRP}$ represents the time for an L1-RSRP measurement for Rx beam refinement, and is defined as $T_{L1-RSPR\_Measurement\_Period\_SSB}$ for an SSB as specified in clause 9.5.4.1 or $T_{L1-RSPR\_Measurement\_Period\_CSI-RS}$ for CSI-RS as specified in clause 9.5.4.2, subject to various other considerations as defined in 3GPP TS38.133 section 8.10.3. $TO_{uk}$=1 for a CSI-RS based L1-RSRP measurement, and $TO_{uk}$=0 for an SSB based L1-RSRP measurement when the TCI state switching involves QCL-TypeD. $TO_{uk}$=1 when the TCI state switching involves other QCL types.

During a MAC-CE based TCI state switch the UE is allowed an interruption due to a one shot timing adjustment on the serving cell or any activated serving cells as defined in clause 8.2.

For an RRC based TCI state switch, the delay is defined in 3GPP TS38.133 section 8.10.5 in the following manner.

If the target TCI state is known, upon receiving the PDSCH carrying an RRC activation command at slot n, the UE shall be able to receive the PDCCH with a target TCI state of the serving cell on which the TCI state switch occurs no later than at slot $n+T_{RRC\_processing}+TO_k*(T_{first-SSB}+T_{SSB-proc})/\text{NR slot length}$ (Equation 5). $T_{RRC\_processing}$ represents the RRC processing delay, and $T_{SSB-proc}$ and $TO_k$ are defined above. The UE is not required to receive the PDCCH/PDSCH or transmit the PUCCH/PUSCH until the end of the switching period. $T_{first-SSB}$ represents the time span from the RRC processing by the UE to a first SSB transmission after the RRC processing. The SSB shall be the QCL-TypeA or QCL-TypeC to the target TCI state.

If the target TCI state is unknown, upon receiving the PDSCH carrying an RRC activation command at slot n, the UE shall be able to receive the PDCCH with the target TCI state of the serving cell on which the TCI state switch occurs no later than at slot $n+(T_{RRC\_processing}+T_{L1-RSRP}+TO_{uk}*(T_{first-SSB}+T_{SSB-proc}))/\text{NR slot length}$ (Equation 6). The UE is not required to receive the PDCCH/PDSCH or transmit the PUCCH/PUSCH until the end of switching period. $T_{first-SSB}$ represents the time span from the L1-RSRP measurement to a first SSB transmission after the L1-RSRP measurement when the TCI state switching involves QCL-TypeD. $T_{first-SSB}$ represents the time span from the RRC processing by the UE to a first SSB transmission after the RRC processing for other QCL types. The SSB shall be the QCL-TypeA or QCL-TypeC to the target TCI state.

During the RRC based TCI state switch, the UE is allowed an interruption due to one shot timing adjustment on the serving or any activated serving cells as defined in clause 8.2.

In 3GPP TS38.214 section 5.1.5, it is specified that when the HARQ-ACK corresponding to the PDSCH carrying the activation command is transmitted in slot n, the indicated mapping between TCI states and codepoints of the DCI field 'Transmission Configuration Indication' should be applied starting from the first slot that is after slot $n+3N_{slot}$.

As mentioned above, in the RAN4 spec 3GPP TS38.133 section 8.10.3, Equation 1 specifies the allowable delay for receiving the PDCCH with a target TCI state and Equation 2 specifies the UE behavior for receiving the PDCCH. However, future releases may change the specification by removing the $TO_k*(T_{first-SSB})$ terms from Equation 2 to comply with RAN1 requirements. Thus, a future release may specify that the UE shall be able to receive the PDCCH with the old TCI state until slot $n+T_{HARQ}+(3 \text{ ms})/\text{NR slot length}$ (Equation 2a).

Figure 4A:
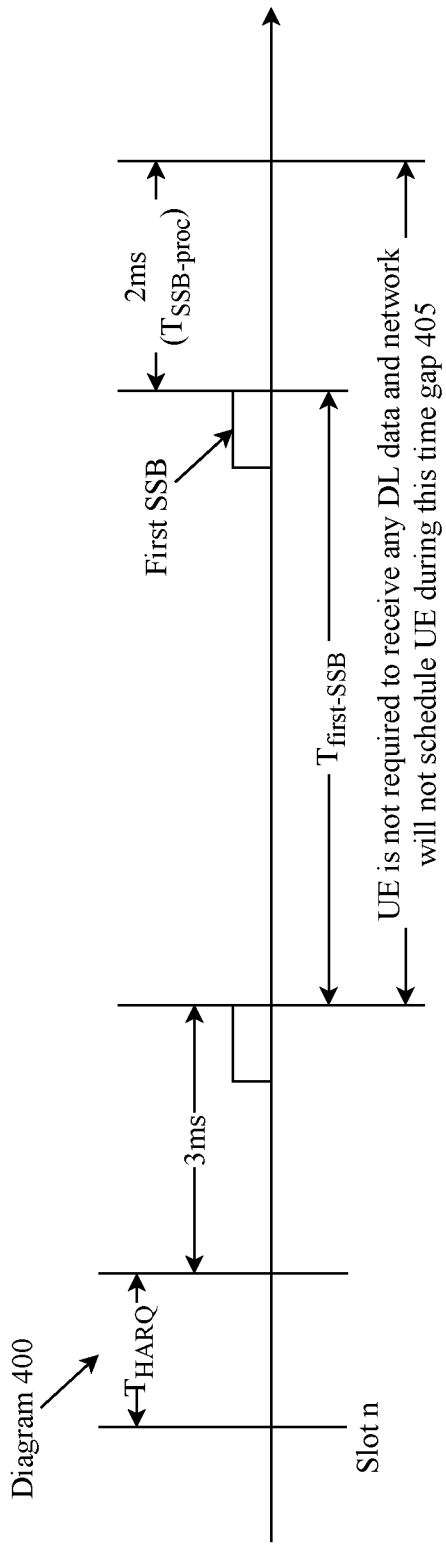
FIG. 4a shows a first timing diagram for a TCI state change according to various exemplary embodiments.

FIG. 4a shows a first timing diagram 400 for a TCI state change according to a first option. The first option incorporates the UE behavior from Equation 2a, discussed above. In the time gap 405 spanning from slot $n+T_{HARQ}+(3 \text{ ms/NR slot length})$ to the end of the TCI switching delay (this delay is a specified value in RAN4 requirement), the UE is not required to receive any DL data and the network will not schedule this UE during this time gap 405.

Figure 4B:
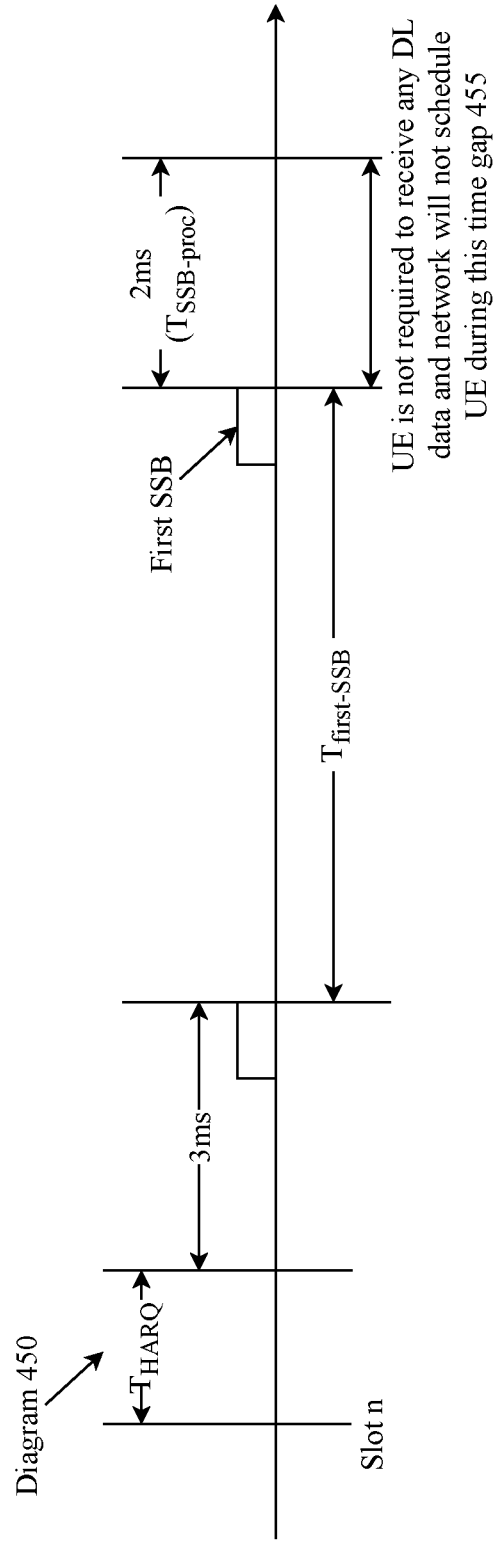
FIG. 4b shows a second timing diagram for a TCI state change according to various exemplary embodiments.

FIG. 4b shows a second timing diagram 450 for a TCI state change according to a second option. The second option incorporates the UE behavior from Equation 2 discussed above. In the second option, the UE shall be able to receive the PDCCH with the old TCI state (i.e. the TCI state prior to switching) until slot $n+T_{HARQ}+(3 \text{ ms}+TO_k^*(T_{first-SSB}))/NR$ slot length. In the time gap 455 spanning from the start of the first SSB block to the end of the TCI switching delay, the UE is not required to receive any DL data and the network will not schedule this UE during this time gap 455.

The time gap 405 for the first option is large relative to the time gap 455 for the second option. Based on the two different implementation options discussed above, an issue arises. If a new release UE enters a network that uses the first option, the network will expect UE behavior in accordance with the first option and will not schedule the UE during $T_{first-SSB}$. However, the new release UE may act in accordance with the second option and try to receive the data or control channels during $T_{first-SSB}$. Because of this backward compatibility issue, resources will be wasted on both the UE side and the network side. Thus, the two implementation options should be aligned.

Network Flag to Indicate TCI Configuration

According to some exemplary embodiments, a network flag may be used to indicate network release information (new or old) to the UE. Based on the network release information, the UE may derive which TCI option the network is implementing and behave in accordance therewith. In other exemplary embodiments, the network flag may be used to indicate a TCI usage (new or old) directly. The network flag may be used during the triggering of the TCI change to the UE on slot n. In other words, the flag may be transmitted in a same manner as a TCI state change indicator. After receiving the information, the UE decides which UE behavior to use during the TCI switching.

If the flag indicates the network is a new release, the UE will keep using the old TCI for a predefined time span based on the parameters of the TCI switch. In the exemplary embodiments described herein, the TCI switch may be implemented via a medium access control (MAC) control element (CE) or a radio resource control (RRC) activation command. A time span for using the old TCI is determined depending on whether the TCI change is MAC CE implemented or RRC implemented, whether the TCI is known or unknown to the UE, and whether $TO_k$ or $TO_{uk}$ is equal to 0 or 1. The following exemplary embodiments describe UE behavior when the network flag indicates the network is a new release network (implementing option 1) or that the network is using a new release TCI usage (implementing option 1).

For a MAC CE based TCI change, if the TCI is known to the UE and $TO_k=1$, the UE will keep using the old TCI until the beginning of a first available SSB after the timing point of (slot $n+T_{HARQ}+(3 \text{ ms}/NR$ slot length)).

For a MAC CE based TCI change, if the TCI is known to the UE and $TO_k=0$, the UE will keep using the old TCI until slot $n+T_{HARQ}+(3 \text{ ms}/NR$ slot length).

For a MAC CE based TCI change, if the TCI is unknown to the UE and $TO_{uk}=1$, the UE will keep using the old TCI until the beginning of a first available SSB after the timing point of (slot $n+T_{HARQ}+((3 \text{ ms}+T_{L1-RSRP})/NR$ slot length)).

For a MAC CE based TCI change, if the TCI is unknown to the UE and $TO_{uk}=0$, the UE will keep using the old TCI until slot $n+T_{HARQ}+((3 \text{ ms}+T_{L1-RSRP})/NR$ slot length).

For an RRC-based TCI change, if the TCI is known to the UE and $TO_k=1$, the UE will keep using the old TCI until the beginning of a first available SSB after the timing point of (slot $n+T_{RRC\_processing}$).

For an RRC-based TCI change, if the TCI is known to the UE and $TO_k=0$, the UE will keep using the old TCI until (slot $n+T_{RRC\_processing}$).

For an RRC-based TCI change, if the TCI is unknown to the UE and $TO_{uk}=1$, the UE will keep using the old TCI until the beginning of a first available SSB after the timing point of slot $n+(T_{RRC\_processing}+T_{L1-RSRP})/NR$ slot length).

For an RRC-based TCI change, if the TCI is unknown to the UE and $TO_{uk}=0$, the UE will keep using the old TCI until slot $n+(T_{RRC\_processing}+T_{L1-RSRP})/NR$ slot length).

If the network flag indicates the network is an old release network, the UE will keep using the old TCI until slot $n+T_{HARQ}+(3 \text{ ms}/NR$ slot length) for MAC CE based TCI change and until slot $n+T_{HARQ}$ for an RRC based TCI change.

Figure 5:
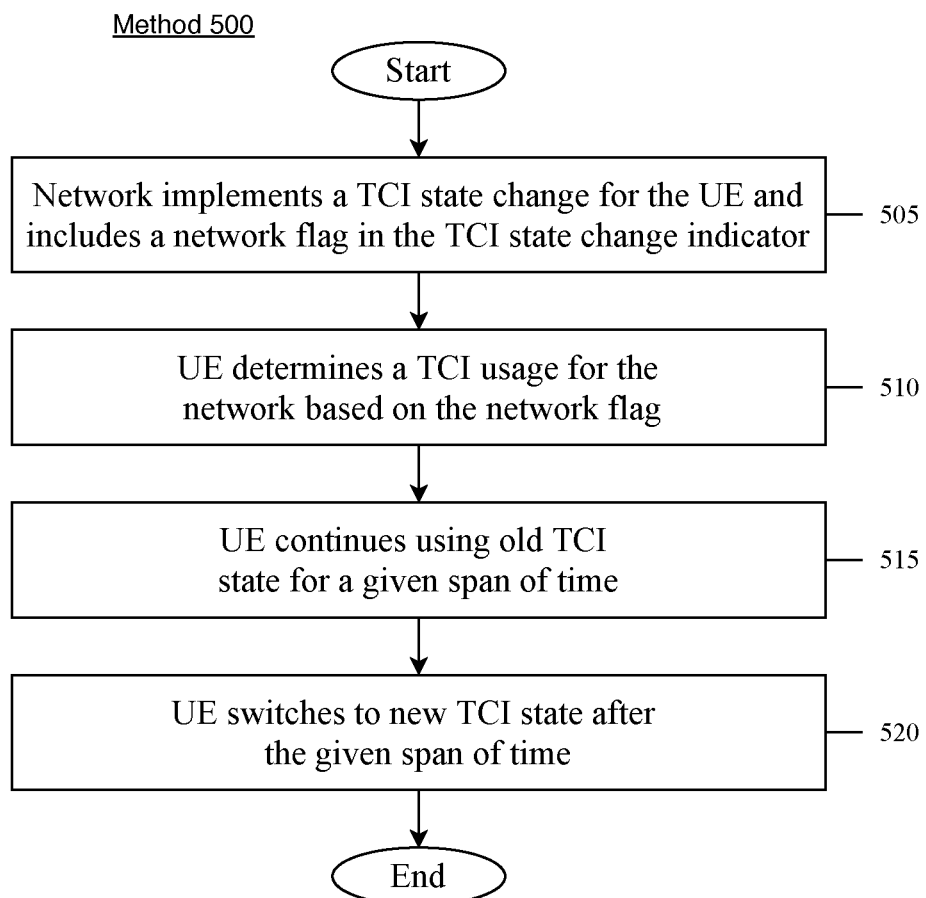
FIG. 5 shows a method for determining a UE behavior based on a network configuration for a TCI state change indicated by a network flag according to various exemplary embodiments.

FIG. 5 shows a method 500 for determining a user equipment (UE) behavior based on a network configuration for a TCI state change indicated by a network flag.

In 505, the network implements a TCI state change for the UE and includes a network flag in the TCI state change indicator. In one embodiment, the network flag indicates whether the network is a new release network or an old release network. The new release network may implement the first option discussed above, and the old release network may implement the second option discussed above. In another embodiment, the network flag directly indicates a TCI usage as either one of the first option or the second option. The TCI state change indicator sent from the network to the UE may be MAC CE based or RRC based.

In 510, the UE determines a TCI usage for the network based on the network flag, i.e., whether the network is using the first option or the second option.

In 515, the UE continues using the old TCI state, i.e., the TCI state the UE was in when it received the TCI state change indicator, for a given span of time. The time span is dependent on whether the TCI state change indicator is MAC CE based or RRC based, whether the TCI state is known or unknown, and the value of the $TO_k$ or $TO_{uk}$ parameter. The UE behaves in accordance with the network expectation. In 520, the UE switches to the new TCI state after the time span.

In a second exemplary embodiment, no network flag is used. However, a UE TCI usage may be determined based on whether the TCI change is indicated by a MAC CE or by the RRC. The UE may receive a triggering for the TCI change on slot n. For a MC CE based TCI change, the UE may keep using the old TCI until slot $n+T_{HARQ}+(3 \text{ ms}/NR$ slot length). For an RRC based TCI change, the UE may keep using the old TCI until slot $n+T_{HARQ}$.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a user equipment (UE) communicating with a base station of a network and configured to perform operations comprising:
   receiving, from the base station, a network flag indicating a transmission configuration indicator (TCI) state change configuration for the network, wherein the network flag is transmitted with a TCI state change indicator;
   determining a time span for continuing to use a current TCI state prior to switching to a new TCI state based on the network flag; and
   switching to the new TCI state after the time span.

2. The processor of claim 1, wherein the network flag indicates a current release on which the network is operating.

3. The processor of claim 1, wherein the network flag indicates a TCI usage release on which the network is operating.

4. The processor of claim 1, wherein the TCI state change indicator is transmitted via a medium access control (MAC) control element (CE) or a radio resource control (RRC) activation command.

5. The processor of claim 4, wherein, when a new release is indicated for the network, the time span is determined based on whether the TCI state change is MAC CE implemented or RRC implemented.

6. The processor of claim 5, wherein the time span is further determined based on whether the new TCI state is known or unknown to the UE.

7. The processor of claim 6, wherein the time span is further determined based on a value for a $TO_k$ parameter or a $TO_{uk}$ parameter.

8. The processor of claim 1, wherein, when an old release is indicated for the network, the UE determines the time span based only on whether the TCI state change is MAC CE implemented or RRC implemented.

9. A user equipment (UE) comprising:
   a transceiver configured to communicate with a base station of a network; and
   a processor communicatively coupled to the transceiver and configured to perform operations comprising:
   receiving, from the base station, a network flag indicating a transmission configuration indicator (TCI) state change configuration for the network, wherein the network flag is transmitted with a TCI state change indicator;
   determining a time span for continuing to use a current TCI state prior to switching to a new TCI state based on the network flag; and
   switching to the new TCI state after the time span.

10. The UE of claim 9, wherein the network flag indicates a current release on which the network is operating.

11. The UE of claim 9, wherein the network flag indicates a TCI usage release on which the network is operating.

12. The UE of claim 9, wherein the TCI state change indicator is provided via a medium access control (MAC) control element (CE) or a radio resource control (RRC) activation command.

13. The UE of claim 12, wherein, when a new release is indicated for the network, the time span is determined based on whether the TCI state change is MAC CE implemented or RRC implemented.

14. The UE of claim 13, wherein the time span is further determined based on whether the new TCI state is known or unknown to the LIE.

15. The UE of claim 14, wherein the time span is further determined based on a value for a $TO_k$ parameter or a $TO_{uk}$ parameter.

16. The UE of claim 9, wherein, when an old release is indicated for the network, the UE determines the time span based only on whether the TCI state change is MAC CE implemented or RRC implemented.

17. A processor of a user equipment (UE) communicating with a base station of a network and configured to perform operations comprising:
   receiving, from the base station, a TCI state change indicator in either one of a medium access control (MAC) control element (CE) or a radio resource control (RRC) activation command;
   using a current TCI state for a first span of time when the TCI state change indicator is MAC CE based;
   using a current TCI state for a second span of time different from the first span of time when the TCI state change indicator is RRC based.

18. The processor of claim 17, wherein the first span of time is determined based on slot $n+T_{HARQ}+(3$ ms/slot length), where slot n is the slot in which the MAC CE was received, and $T_{HARQ}$ is a time during which hybrid automatic repeat request (HARQ) communications for the slot n occur.

19. The processor of claim 17, wherein the second span of time is determined based on slot $n+T_{HARQ}$ where slot n is the slot in which the MAC CE was received, and $T_{HARQ}$ is a time during which hybrid automatic repeat request (HARQ) communications for the slot n occur.

20. The processor of claim 1, where a TCI state contains parameters for configuring a quasi co-location (QCL) relationship between one or more downlink reference signals and corresponding antenna ports.

* * * * *

UNITED STATES PATENT AND TRADEMARK OFFICE
CERTIFICATE OF CORRECTION

PATENT NO. : 11,632,819 B2
APPLICATION NO. : 17/303280
DATED : April 18, 2023
INVENTOR(S) : Cui et al.

Page 1 of 1

It is certified that error appears in the above-identified patent and that said Letters Patent is hereby corrected as shown below:

In the Claims

Claim 14, Column 10, Line 24-25:
"determined based on whether the new TCI state is known or unknown to the LIE"
Should read as:
"determined based on whether the new TCI state is known or unknown to the UE".

Signed and Sealed this
Thirtieth Day of May, 2023

Katherine Kelly Vidal
*Director of the United States Patent and Trademark Office*